(12) United States Patent
Ballagas et al.

(10) Patent No.: US 8,873,741 B2
(45) Date of Patent: Oct. 28, 2014

(54) METHODS, APPARATUSES AND COMPUTER PROGRAM PRODUCTS FOR PROVIDING ACTIVE ECHO-CANCELLATION FOR SYSTEMS COMBINING VOICE COMMUNICATION AND SYNCHRONOUS AUDIO CONTENT

(75) Inventors: Rafael Ballagas, Palo Alto, CA (US);
Hayes Raffle, Palo Alto, CA (US);
Koichi Mori, San Jose, CA (US)

(73) Assignee: Nokia Corporation, Espoo (FI)

( * ) Notice: Subject to any disclaimer, the term of this patent is extended or adjusted under 35 U.S.C. 154(b) by 211 days.

(21) Appl. No.: 13/173,728

(22) Filed: Jun. 30, 2011

(65) Prior Publication Data
US 2013/0003962 A1    Jan. 3, 2013

(51) Int. Cl.
*H04M 9/08*    (2006.01)
*H04L 12/28*    (2006.01)

(52) U.S. Cl.
USPC ..................................... 379/406.06; 370/268

(58) Field of Classification Search
USPC ....................... 379/406.01; 370/286; 455/303
See application file for complete search history.

(56) References Cited

U.S. PATENT DOCUMENTS

| 8,095,120 B1* | 1/2012 | Blair et al. ..................... 455/416 |
| 2005/0286496 A1* | 12/2005 | Malhotra et al. .............. 370/352 |
| 2009/0147966 A1 | 6/2009 | McIntosh et al. |
| 2010/0272251 A1* | 10/2010 | Banba et al. ............. 379/406.08 |
| 2011/0019810 A1* | 1/2011 | Alexandrov et al. .... 379/204.01 |

OTHER PUBLICATIONS

International Searching Authority, International Search Report and Written Opinion for International Application No. PCT/FI2012/050529, mailed Sep. 6, 2012, 11 pages, National Board of Patents and Registration of Finland, Finland.

* cited by examiner

*Primary Examiner* — Fan Tsang
*Assistant Examiner* — Jeffrey Lytle
(74) *Attorney, Agent, or Firm* — Alston & Bird LLP

(57) ABSTRACT

An apparatus for removing an echo(es) from audio content may include a processor and memory storing executable computer code causing the apparatus to at least perform operations including receiving combined audio content including voice data associated with speech of users in a call and information including audio data provided to the users. The computer program code may further cause the apparatus to remove a first echo of a first item of voice data associated with a user(s), from the combined audio content, based in part on a prior detection of the first item of voice data. The computer program code may further cause the apparatus to remove a second echo of the audio data, from the combined audio content, based in part on a previous detection of the audio data or a previous detection of data corresponding to the audio data. Corresponding methods and computer program products are also provided.

20 Claims, 9 Drawing Sheets

METHODS, APPARATUSES AND COMPUTER PROGRAM PRODUCTS FOR PROVIDING ACTIVE ECHO-CANCELLATION FOR SYSTEMS COMBINING VOICE COMMUNICATION AND SYNCHRONOUS AUDIO CONTENT

TECHNOLOGICAL FIELD

An example embodiment of the present invention relates generally to wireless communications and more particularly, relates to a method, apparatus and computer program product for removing echo from voice and audio communications.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to provision of audio data via communication devices.

At present, echo in voice communications across telephones may exist. Currently, echo cancellation, may be performed to remove echo from a voice communication in order to improve voice (e.g., voices of individuals on a call) quality on a telephone call. In addition to improving subjective quality, echo cancellation may increase the capacity achieved through silence suppression by preventing echo from traveling across a network.

Existing echo cancellation systems generally involve first recognizing the originally transmitted voice signal associated with individuals on a call that typically re-appears, in the transmitted or received signal. Once the echo is recognized, it may be removed by subtracting it from the transmitted or received voice signal associated with the voices of the individuals on a call.

Although conventional systems may remove echo associated with voices of individuals on a call, conventional systems typically may not remove echo caused by other audio sources. For instance, conventional systems may not perform audio echo cancellation for systems that combine voice communication in addition to streamed audio content. At present, undesirable echo may occur, for example, in collaboration systems that may combine video conferencing and online streaming of audio or videos.

For instance, two users who are at different locations may wish to watch a video or listen to an audio track together while they are having a voice or video conference. If the users are using a speakerphone feature, a communication channel may create an echo or feedback loop because a user's microphone may typically sense the audio output of a speaker and typically redirects the audio back to the sender.

In an instance in which two or more users who are having a voice or video chat and are also listening to streaming audio broadcast such as, for example, a web feed of a Moving Picture Experts Group (MPEG)-2 Audio Layer III (MP3) file or an audio track (e.g., YouTube™ video) or the like, the users may typically hear the audio broadcast twice, for example, once from their local audio stream and once from the remote voice feed. The resulting "echo" typically may result in poor audio quality and may create an undesirable user experience.

Many existing collaboration systems that combine voice communication and audio sharing typically do not include improved echo cancellation, which may generally lead to echo of the shared audio content.

In view of the foregoing drawbacks, it may be beneficial to provide a mechanism for removing the echo associated with combined voice and audio data in an efficient and reliable manner.

BRIEF SUMMARY

A method, apparatus and computer program product are therefore provided for enabling provision of an efficient and reliable manner of removing echo from voice data and other audio content. In this regard, an example embodiment may perform audio echo cancellation for systems that combine voice communication and streamed audio content. For example, collaboration systems that may combine video conferencing and online streaming audio or videos (e.g., YouTube™, Hulu™, etc.).

As such, an example embodiment may provide an improved echo cancellation system for use in systems which may combine synchronous voice communication and streaming audio. In this regard, an example embodiment may cancel echo of both the voice and audio streams by subtracting or removing both the voice and the audio data (e.g., audio tracks) from a microphone input before the microphone input is transmitted to a remote user.

In one example embodiment, a method for removing one or more echoes from audio content is provided. The method may include receiving combined audio content including items of voice data associated with speech content of one or more users participating in a call. The received combined audio content may also include information including audio data being provided to the users during the call. The method may further include removing a first echo associated with a first item of the voice data associated with one of the users, from the combined audio content. The first echo may be removed based in part on a prior detection of the first item of the voice data. The method may further include removing a second echo associated with the audio data, from the combined audio content. The second echo may be removed based in part on a previous detection of the audio data or a previous detection of data that corresponds to the audio data.

In another example embodiment, an apparatus for removing one or more echoes from audio content is provided. The apparatus may include a processor and memory including computer program code. The memory and the computer program code are configured to, with the processor, cause the apparatus to at least perform operations including receiving combined audio content including items of voice data associated with speech content of one or more users participating in a call. The received combined audio content may also include information including audio data being provided to the users during the call. The computer program code may further cause the apparatus to remove a first echo associated with a first item of the voice data associated with one of the users, from the combined audio content. The first echo may be removed based in part on a prior detection of the first item of the voice data. The computer program code may further cause the apparatus to remove a second echo associated with the audio data, from the combined audio content. The second echo may be removed based in part on a previous detection of the audio data or a previous detection of data that corresponds to the audio data.

In another example embodiment, a computer program product for removing one or more echoes from audio content is provided. The computer program product includes at least one computer-readable storage medium having computer-executable program code portions stored therein. The computer-executable program code instructions may include program code instructions configured to facilitate receipt of combined audio content including items of voice data associated with speech content of one or more users participating in a call. The received combined audio content may also include information including audio data being provided to the users during the call. The program code instructions may also be configured to remove a first echo associated with a first item of the voice data associated with one of the users, from the combined audio content. The first echo may be removed based in part on a prior detection of the first item of the voice data. The program code instructions may also be configured to remove a second echo associated with the audio data, from the combined audio content. The second echo may be removed based in part on a previous detection of the audio data or a previous detection of data that corresponds to the audio data.

Some example embodiments may provide a better user experience by combining voice communications and streaming audio to provide a clean non-echoing audio experience via communication devices. As such, device users may enjoy improved capabilities with respect to audio quality.

BRIEF DESCRIPTION OF THE SEVERAL VIEWS OF THE DRAWINGS

Figure 1:
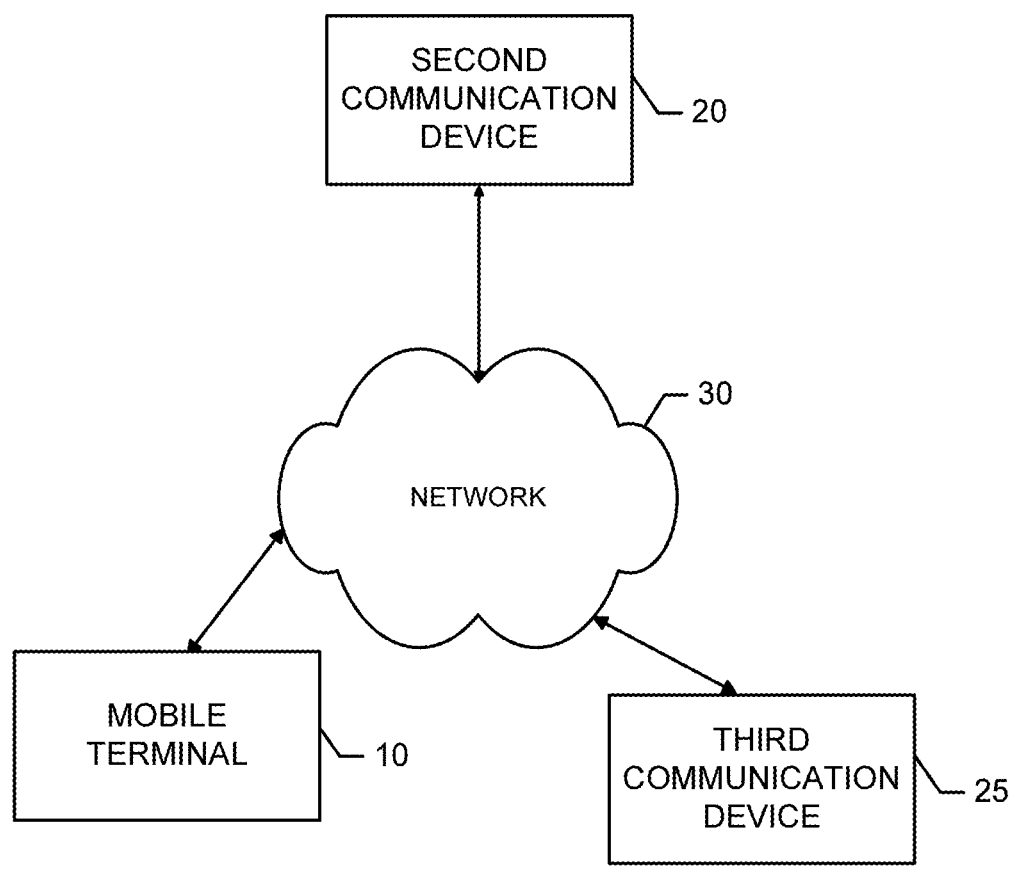
Figure 2:
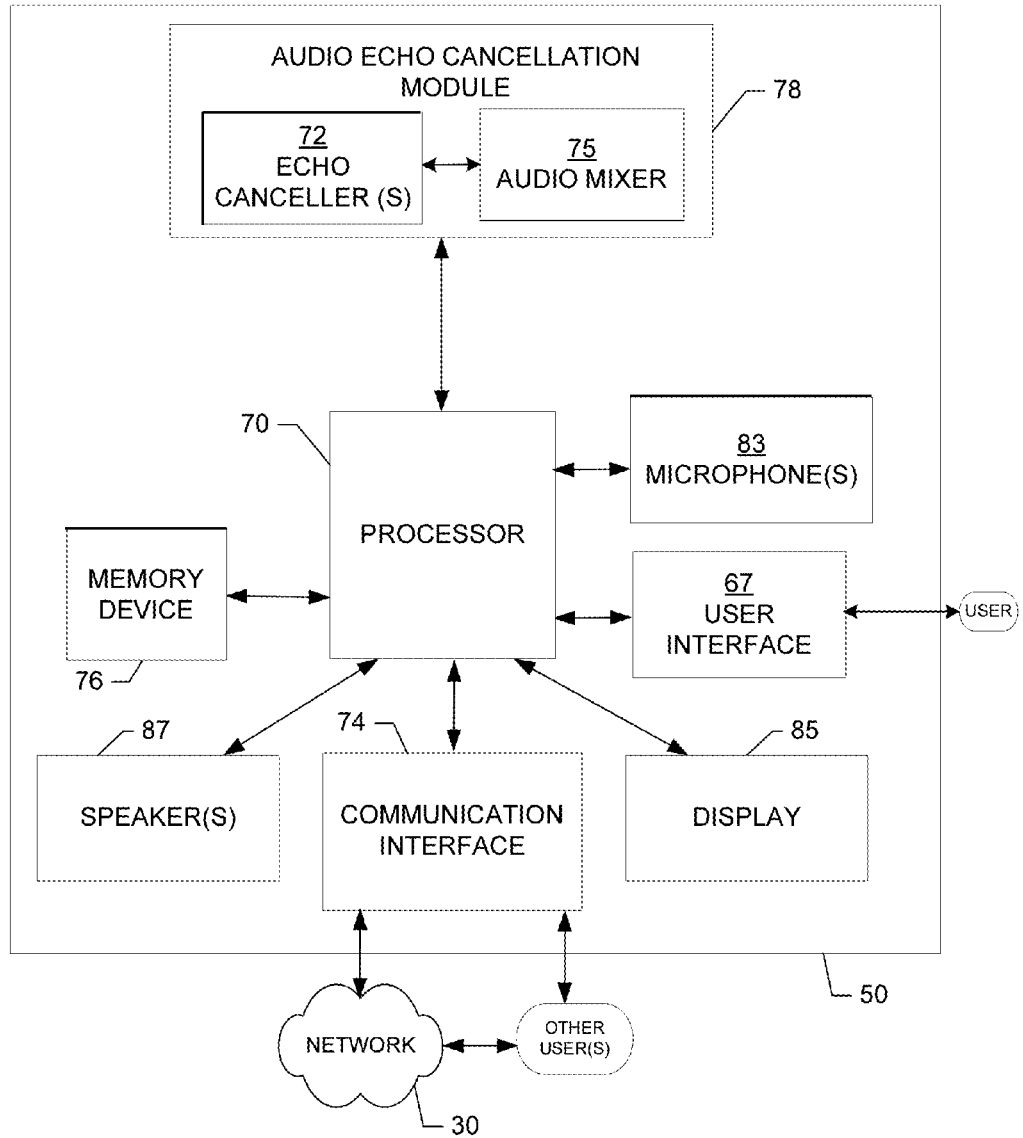
Figure 3:
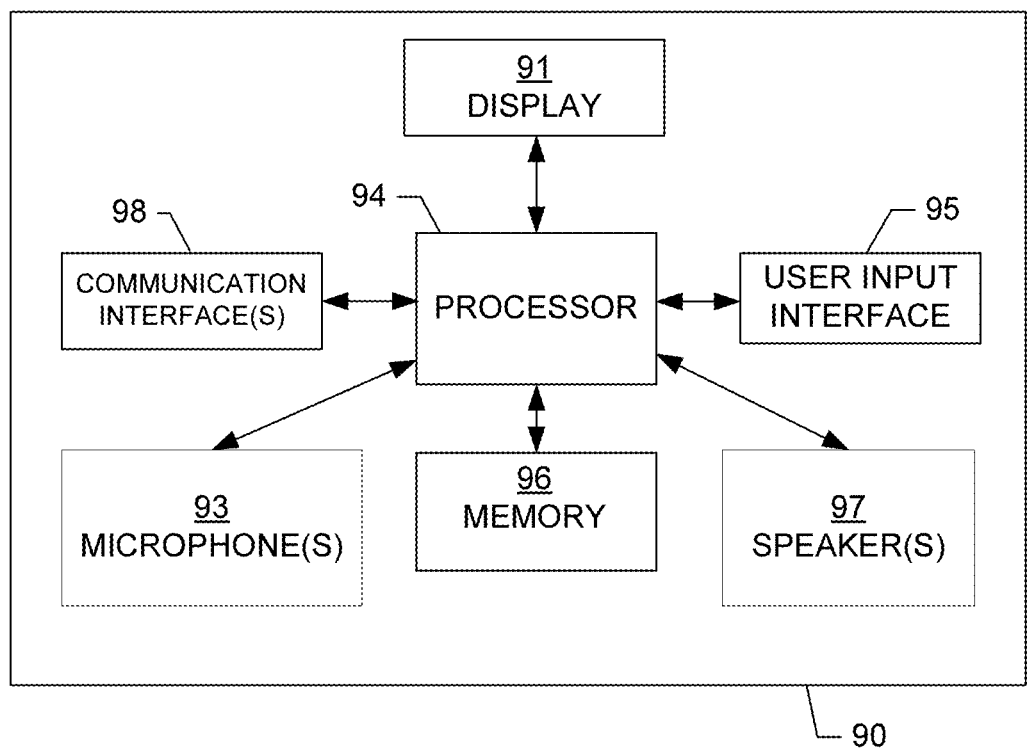
Figure 4:
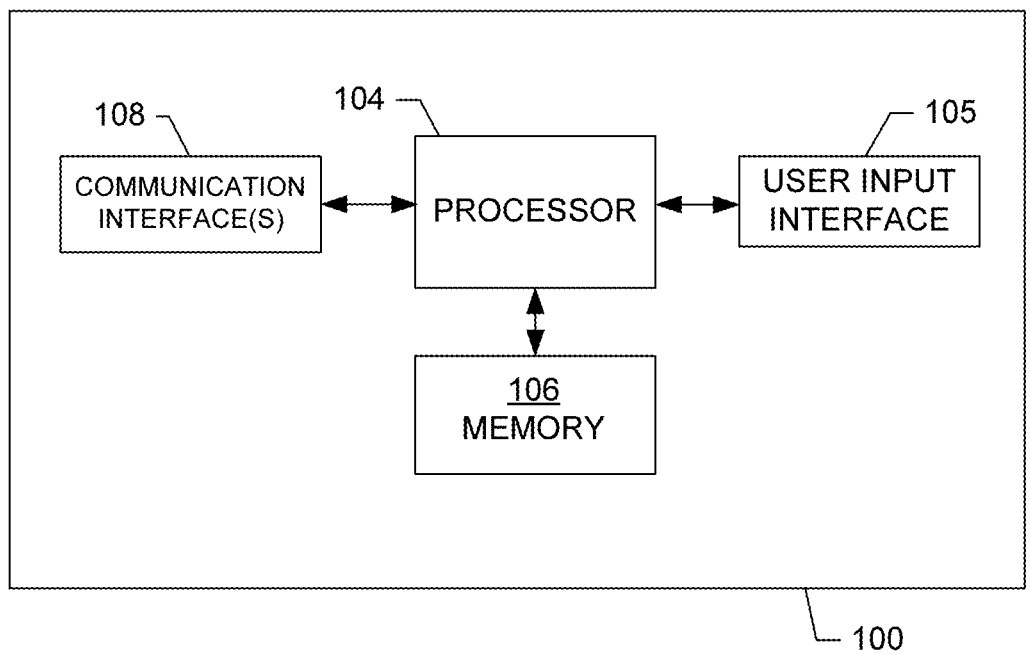
Figure 5:
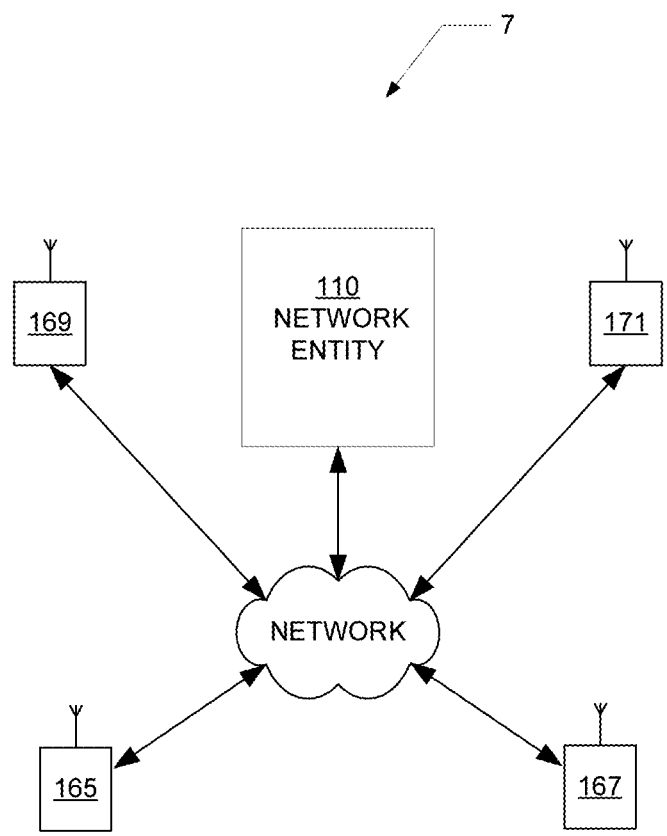
Figure 6:
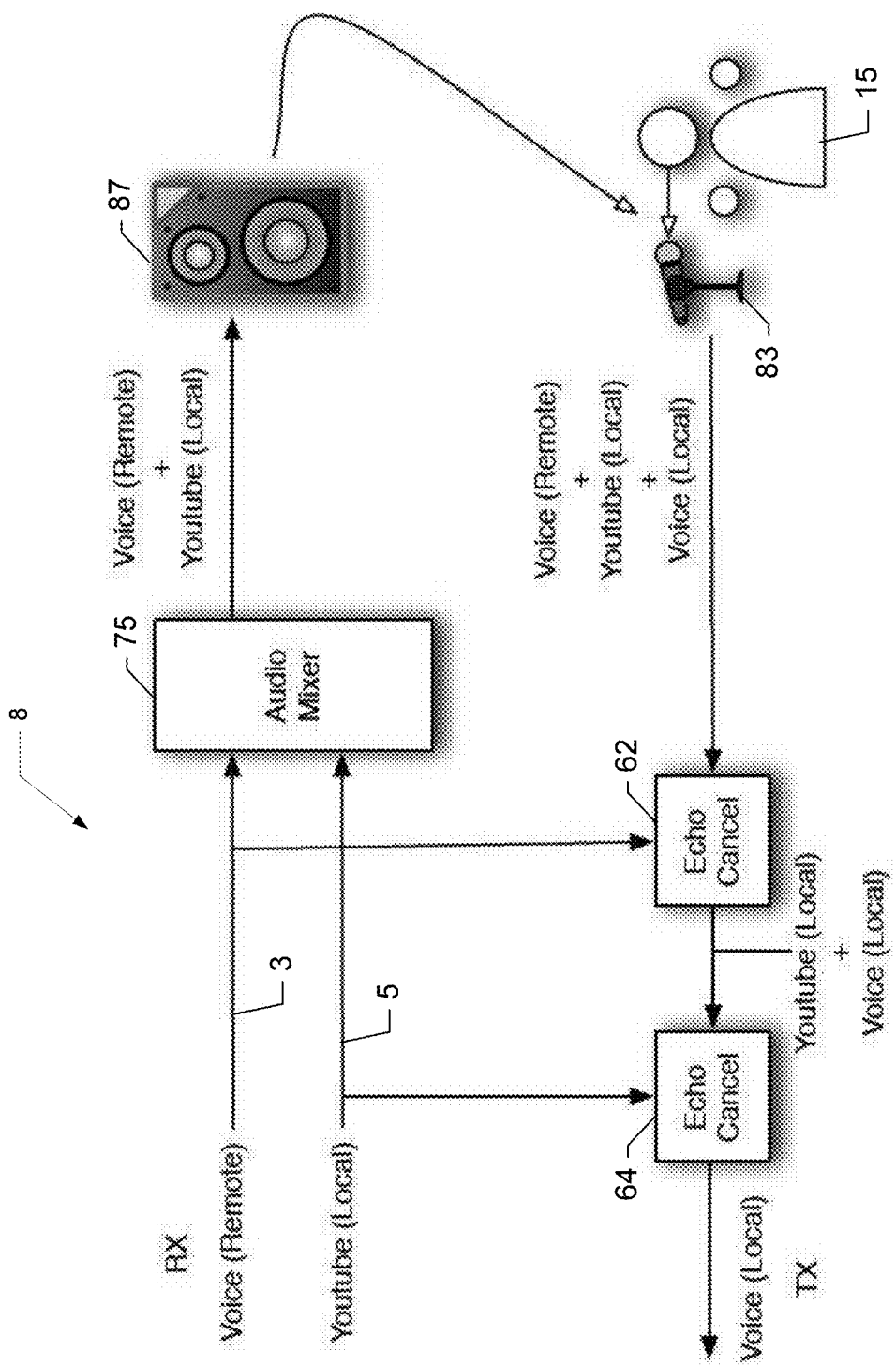
Figure 7:
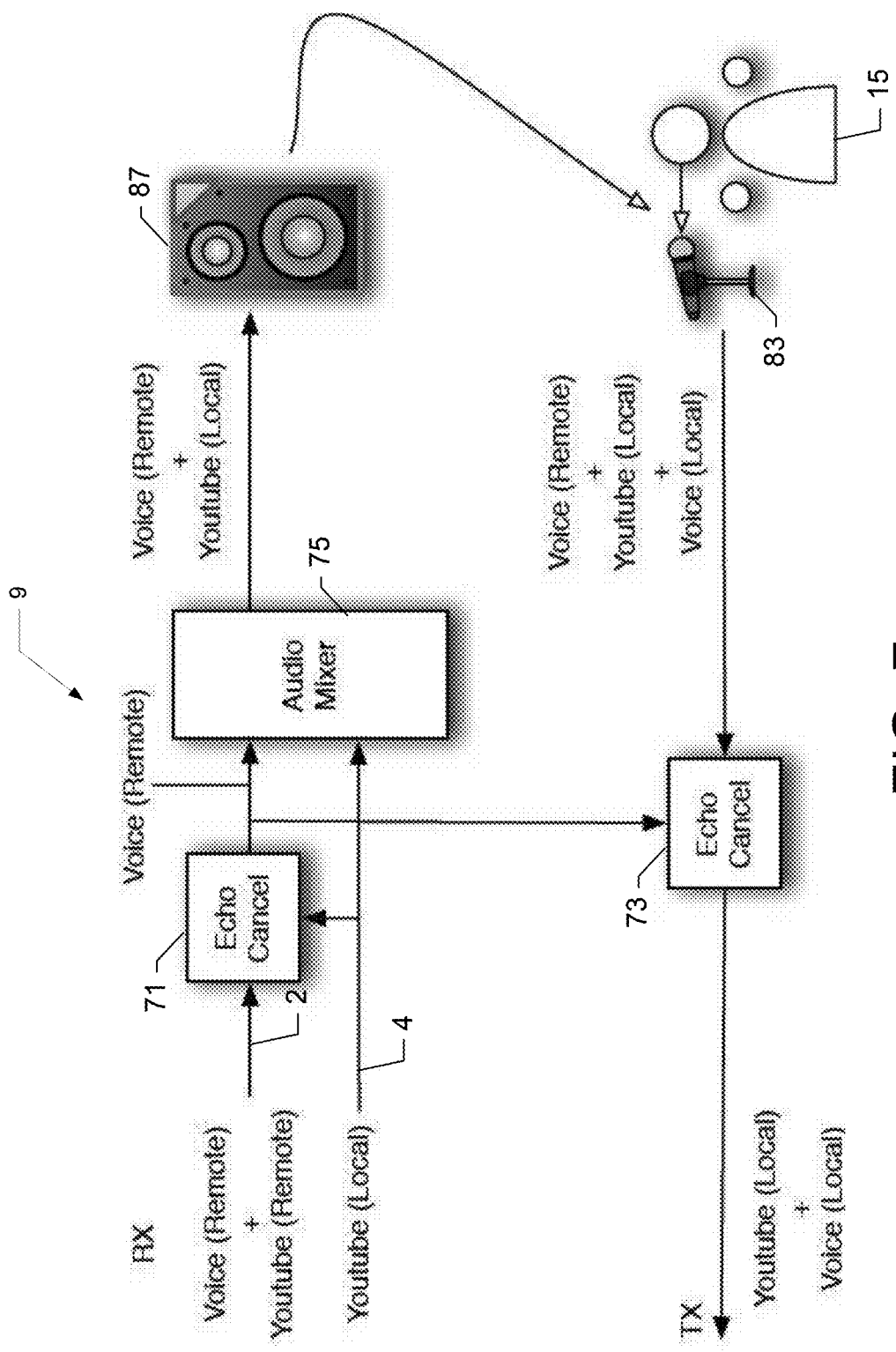
Figure 8:
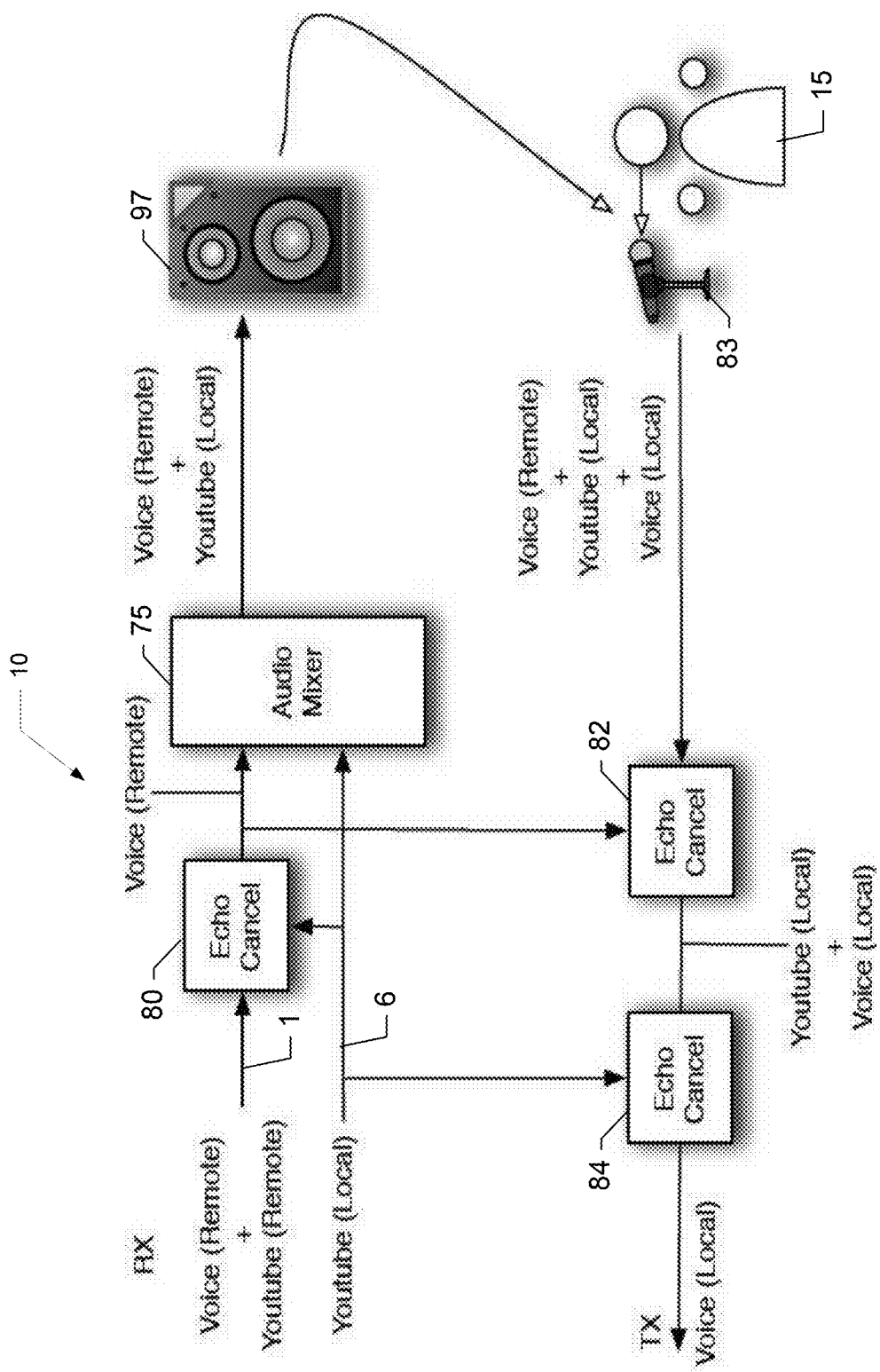
Figure 9:
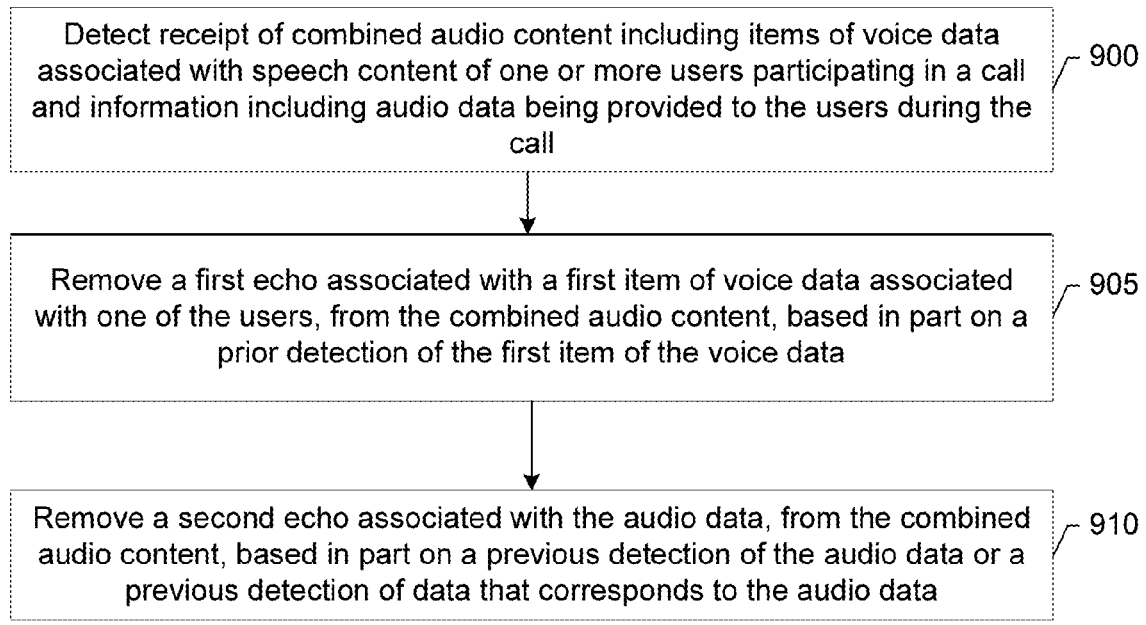

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a schematic block diagram of an electronic device according to an example embodiment of the invention;

FIG. 4 is a schematic block diagram of a network device according to an example embodiment of the invention;

FIG. 5 is a schematic block diagram of a system according to an example embodiment of the invention;

FIG. 6 is a schematic block diagram of a system according to another example embodiment of the invention;

FIG. 7 is a schematic block diagram of a system according to another example embodiment of the invention;

FIG. 8 is a schematic block diagram of a system according to another example embodiment of the invention; and FIG. 9 illustrates a flowchart for removing echo from voice communications and other audio content according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

FIG. 1 illustrates a generic system diagram in which a device such as a mobile terminal 10 is shown in a communication environment according to some example embodiments. As shown in FIG. 1, a system in accordance with some example embodiments may include a first communication device (for example, mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ an embodiment of the present invention may comprise all the devices illustrated and/or described herein. While example embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) and/or Global Navigation Satellite System (GLONASS) devices, Bluetooth headsets, Universal Serial Bus (USB) devices or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. According to some example embodiments, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. According to some example embodiments, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Wi-Fi Network, a Metropolitan Area Network (MAN), and/or a Wide Area Network (WAN), such as the Internet. In turn, other devices such as processing elements (for example, personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore the mobile terminal 10 and the second and third communication devices 20 and 25 may communicate in accordance with, for example, Radio Frequency (RF), Cellular, Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

According to some example embodiments, the first communication device (for example, the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

According to some example embodiments, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

According to some example embodiments, the mobile terminal as well as the second and third communication devices 20 and 25 may employ an apparatus (for example, apparatus of FIG. 2) capable of functioning according to example embodiments of the invention. In some example embodiments, the second communication device 20 may be an electronic device (e.g., electronic device 90 of FIG. 3) and the third communication device 25 may be a network device (e.g., network device 100 of FIG. 4), as described more fully below.

FIG. 2 illustrates a schematic block diagram of an apparatus for removing echo from audio data according to some example embodiments. Some example embodiments of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, some embodiments of the invention may be embodied wholly at a single device (for example, the mobile terminal 10), by a plurality of devices in a distributed fashion (for example, on one or a plurality of devices in a P2P network) or by devices in a client/server relationship. Furthermore, it should be noted that the devices or elements described below may not be mandatory and thus some may be omitted in some embodiments.

Referring now to FIG. 2, the apparatus 50 may include or otherwise be in communication with a processor 70, a user interface 67, a communication interface 74, a memory device 76, a display 85, one or more speakers 87 (also referred to herein as speaker(s) 87), one or more microphones 83 (also referred to herein as microphone(s) 83), and an audio echo cancellation module 78.

According to some example embodiments, the display 85 may be a touch screen display. The memory device 76 may include, for example, volatile and/or non-volatile memory. For example, the memory device 76 may be an electronic storage device (for example, a computer readable storage medium) comprising gates configured to store data (for example, bits) that may be retrievable by a machine (for example, a computing device like processor 70). In some embodiments, the memory device 76 may be a tangible memory device that is not transitory. The memory device 76 may be configured to store information (for example, voice data (e.g., speech data), audio data, video data, etc.), data, files, applications, instructions or the like for enabling the apparatus to carry out various functions in accordance with example embodiments of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (for example, pictures (e.g., images), videos, audio data, etc.).

The apparatus 50 may, according to some example embodiments, be a mobile terminal (for example, mobile terminal 10) or a fixed communication device or computing device configured to employ example embodiments of the invention. According to some example embodiments, the apparatus 50 may be embodied as a chip or chip set. In other words, the apparatus 50 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus 50 may therefore, in some cases, be configured to implement embodiments of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In some example embodiments, the processor 70 may be configured to execute instructions stored in the memory device 76 or otherwise accessible to the processor 70. As such, whether configured by hardware or software methods, or by a combination thereof, the processor 70 may represent an entity (for example, physically embodied in circuitry) capable of performing operations according to embodiments of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (for example, a mobile terminal or network device) adapted for employing embodiments of the invention by further configuration of the processor 70 by instructions for performing the algorithms and operations described herein. The processor 70 may include, among other things, a clock, an arithmetic logic unit (ALU) and logic gates configured to support operation of the processor 70.

In some example embodiments, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

The communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In some example embodiments in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (for example, software and/or firmware) stored on a memory accessible to the processor 70 (for example, memory device 76, and/or the like).

In some example embodiments, the processor 70 may be embodied as, include or otherwise control the audio echo cancellation module 78. The audio echo cancellation module 78 may be any means such as a device or circuitry operating in accordance with software or otherwise embodied in hardware or a combination of hardware and software (for example, processor 70 operating under software control, the processor 70 embodied as an ASIC or FPGA specifically configured to perform the operations described herein, or a combination thereof) thereby configuring the device or circuitry to perform the corresponding functions of the audio echo cancellation module 78, as described below. Thus, in an example in which software is employed, a device or circuitry (for example, the processor 70 in one example) executing the software forms the structure associated with such means.

The audio echo cancellation module 78 may include one or more echo cancellers 72 (also referred to herein as echo canceller(s) 72) and an audio mixer 75. The echo canceller(s) 72 may be any means such as a device or circuitry operating in accordance with software or otherwise embodied in hardware or a combination of hardware and software (for example, processor 70 operating under software control) configured to perform the corresponding functions of the echo canceller(s) 72, as described herein. The echo canceller(s) 72 may be configured to reduce or remove the echo identified on a communication channel. In an example embodiment, the echo canceller(s) 72 may remove or subtract a known echo from audio data (e.g., voice data (e.g., a voice signal(s)), streamed audio data, etc.). The audio mixer 75 may be any means such as a device or circuitry operating in accordance with software or otherwise embodied in hardware or a combination of hardware and software (for example, processor 70 operating under software control) configured to perform the corresponding functions of the audio mixer 75, as described herein. In an example embodiment, the audio mixer 75 may combine a voice communication (e.g., voice signals corresponding to voices of one or more individuals/users) and streamed or broadcast audio. In addition, the audio mixer 75 may output the combined audio to a speaker(s) (e.g., speaker(s) 87).

The audio echo cancellation module 78 may perform audio echo cancellation by removing or subtracting one or more known or previously detected audio signals from voice communications as well as from audio content that may be broadcast or streamed (e.g., synchronously), as described more fully below. In this regard, the audio echo cancellation module 78 may combine synchronous voice communications and broadcast/streaming audio data. As such, the audio echo cancellation module 78 may cancel the echo of both the voice and audio streams by subtracting or removing the echo of both the voice and the audio data (e.g., audio tracks) from an input of the microphone(s) 83 before the microphone(s) 83 transmits audio data to a user (e.g., a remote user (e.g., a user receiving the transmitted audio)), as described more fully below. In this manner, the audio echo cancellation module 78 may combine voice communications and streaming/broadcast audio data and may provide a non-echoing audio experience for users.

Referring now to FIG. 3, a block diagram of an example embodiment of an electronic device is provided. As shown in FIG. 3, the electronic device 90 (e.g., a network device (e.g., a server), a personal computer, a laptop computer, a wireless telephone, a mobile phone, etc.) generally includes a processor 94 and an associated memory 96. The memory 96 may comprise volatile and/or non-volatile memory, and may store content, data and/or the like. The memory 96 may store client applications, instructions, and/or the like for the processor 94 to perform the various operations of the network entity.

The processor 94 may also be connected to at least one communication interface 98 or other means for displaying, transmitting and/or receiving data, content, and/or the like. The user input interface 95 may comprise any of a number of devices allowing the network entity to receive data from a user, such as a keypad, a touch display 91, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like). The electronic device 90 may include at least one speaker(s) 97 and at least one microphone(s) 93. In an example embodiment, the processor 94 may facilitate one or more communications with one or more devices. The communications may include, but are not limited, to one or more telephone calls. Additionally, the processor 94 may facilitate communications with one or more network devices (e.g., network device 100 of FIG. 4 (e.g., a server). In this regard, the processor 94 may receive media data (e.g., audio content and/or video data) from one or more of the network devices.

Referring now to FIG. 4, a block diagram of an example embodiment of a network device is provided. As shown in FIG. 4, the network device 100 (e.g., a server) may include a processor 104 and a memory 106. The memory 106 may comprise volatile and/or non-volatile memory, and may store content, data and/or the like. The memory 106 may store client applications, instructions, and/or the like for the processor 104 to perform the various operations of the network entity.

The processor 104 may also be connected to at least one communication interface 108 or other means for displaying, transmitting and/or receiving data, content, and/or the like. The user input interface 105 may comprise any of a number of devices allowing the network entity to receive data from a user, such as a keypad, a touch display, a joystick or other input device. In this regard, the processor 104 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like). In an example embodiment, the processor 104 may facilitate provision of media data to one or more devices (e.g., apparatus 50, electronic device 90, etc.). In this regard, the processor 104 may stream or broadcast media data (e.g., audio data, video data, etc.) to the devices (e.g., apparatus 50, electronic device 90).

Referring now to FIG. 5, a system for removing echo from audio data according to an example embodiment is provided. The system 7 may include communication devices 165 and 167 (e.g., apparatuses 50) and terminal devices 169, 171 (e.g., electronic devices 90). Additionally, the system 7 may include a network entity 110 (e.g., network device 100). Although two communication devices 165, 167, two terminal devices 169, 171 and one network entity 110 are shown in system 7 of FIG. 5, it should be pointed out that any suitable number of communication devices 165, 167, terminal devices 169, 171 and network entities 110 may be included in system 7 of FIG. 5 without departing from the spirit and scope of the invention.

In the example embodiment of FIG. 5, one or more of the communication devices 165, 167 may be in communication with one or more of the terminal devices 169, 171 via a call (e.g., telephone call, teleconference call, video conference call, etc.). In this regard, the voices of the users participating in the call may be output by the speakers (e.g., speaker(s) 87, speaker(s) 97). Additionally, during the call, the communication devices 165, 167 and the terminal devices 169, 171 participating in the call may request media data (e.g., a YouTube™ video, a Hulu™ video, MP3 data, etc.) from the network entity 110. In an alternative example embodiment, one or more of the communication devices 165, 167 and/or the terminal devices 169, 171 may have the media data previously stored in a memory device (e.g., memory device 76, memory 96) instead of being received from the network entity 110. In response, the network entity 110 may send the requested media data to the devices. For example, the network entity 110 may send the communication devices 165, 167 and the terminal devices 169, 171 participating in the call the media data by broadcasting the media data or streaming the media data. In one example embodiment, the media data may include audio data and/or corresponding video data.

Upon receipt of the media data, the media data may be executed by a processor (e.g., processor 70, processor 94). In this regard, in this example embodiment, the communication devices and terminal devices participating in the call may enable output of the corresponding audio of the media data via a speaker(s). In addition, in an instance in which the media data also includes video data, a processor (e.g., processor 70, processor 94) may enable display of the corresponding video data via a display device (e.g., display 85, display 91).

The audio of the media data that may be output via a speaker and the voice data associated with speech data, for example, of the users participating in the call may cause or create one or more echoes. In this regard, the audio echo cancellation module 78 may remove or cancel the echoes, as described more fully below with respect to FIGS. 6, 7 and 8, for example. In this regard, the example embodiments may provide a better audio experience for users. In some example embodiment, the devices of the systems of FIGS. 6, 7 and 8 may include an application programming interface (API) to enable media data received from a network device to be synchronized when executed or played by a processor (e.g., processor 70, processor 94). In this manner, the audio data of the received media data (and/or video data) may be played at substantially the same time based in part on execution of the API by a processor.

Referring now to FIG. 6, a system for removing echo according to an example embodiment is provided. In the example embodiment of FIG. 6, presume that two users are participating in a call (e.g., telephone call, video conference call, etc.) and that each of the users may utilize one of the communications devices 165, 167 to connect the call. Since the users are utilizing the communications devices 165, 167 both devices 165, 167 participating in the call may include audio echo cancellation functionality provided by the audio echo cancellation module 78. Also, in the example embodiment of FIG. 6, consider that a first user (e.g., user 1) of a communication device (e.g., communication device 165) corresponds to a remote party at a reception (also referred to herein as RX) side of the system 8 and a second user 15 (also referred to herein as local party 15) (e.g., user 2) of a communication device (e.g., communication device 167) is located in front of or nearby a microphone(s) 83. Presume further that both of the communications devices of users 1 and 2 are receiving audio and/or video from the network entity 110. For purposes of illustration, and not of limitation, in the example embodiment of FIG. 6 (as well as the example embodiments of FIGS. 7 and 8), the audio and/or video data being received from the network entity 110 may, but need not, be YouTube™ data. The audio/video data may be streamed or broadcast from the network entity 110 (e.g., synchronously) to the communications devices 165, 167 in this example embodiment (for example, via execution by processor 70 of a synchronization API). The YouTube™ data may relate to the same YouTube™ video being streamed or broadcast to the communication devices 165, 167, in this example embodiment.

In the example embodiment of FIG. 6, at the receiving (RX) side of the system 8, the audio echo cancellation module 78 may detect a voice (also referred to herein as Voice (Remote)) of the remote party (e.g., user 1), on a communication channel 3, participating in the call. In this example embodiment, since the communication device 165 utilized by the remote party may have echo cancellation functionality, the Youtube™ audio data being played (e.g., Youtube™ (Remote)), (for example via processor 70 of the communication device 165) on behalf of the remote party may be canceled out by the audio echo cancellation module 78. As such, the canceled out/removed Youtube™ audio data being played on behalf of the remote party is not shown in FIG. 6.

The audio echo cancellation module 78 may also detect audio of a YouTube™ video (also referred to herein as Youtube™ (Local)), on a communication channel 5, being played by the local party 15 (e.g., user 2). In this regard, the audio echo cancellation module 78 may provide the voice data of the remote party (e.g., Voice (Remote)) and the Youtube™ (Local) audio data to the audio mixer 75. The audio mixer 75 may combine the Voice (Remote) data and the Youtube™ (Local) audio data and may provide or output the combined audio data such as, for example, the Voice (Remote) data with the Youtube™ (Local) audio data to a speaker(s) 87.

The speaker(s) 87 may output or play the combined audio data which may be captured at the input of microphone(s) 83 associated with the local party 15 (e.g., user 2). As such, the microphone(s) 83 may detect the combined audio data (e.g., Voice (Remote) and Youtube™ (Local)) as well as the voice (also referred to herein as Voice (Local)) of the local party 15 who may be speaking into the microphone(s) 83. In this example embodiment, the audio echo cancellation module 78 may determine that at the input of the microphone(s) 83 that one or more echoes may be present in the audio data. For example, the audio echo cancellation module 78 may detect that there is echo associated with the voice of the remote party (e.g., Voice (Remote)) and the Youtube™ (Local) audio data (for example, since the local party 15 may already hear the YouTube™ audio data being played locally). As such, the audio echo cancellation module 78 may utilize the previous detections of the known Voice (Remote) data via communication channel 3 and the known Youtube™ (Local) audio data previously detected via communication channel 5 to cancel this corresponding audio content from the audio data at the input of the microphone(s) 83.

For instance, based on the previous detection of the known voice data of the remote party such as, for example, Voice (Remote) data, the audio echo cancellation module 78 may instruct or enable the echo cancel device 62 (e.g., echo canceller(s) 72) to subtract the known Voice (Remote) data from the Voice (Remote) data of the audio data at the microphone(s) 83. As such, the local party's voice (e.g., Voice (Local)) and Youtube™ (Local) audio data may remain at the microphone(s) 83. However, in response to removing the Voice (Remote) data from the audio data at the microphone(s) 83, the audio echo cancellation module 78 may instruct or enable the echo cancel device 64 (e.g., echo canceller(s) 72) to subtract the known Youtube™ (Local) audio data previously detected via communication channel 5. In this manner, the audio echo cancellation module 78 may determine that the local party's 15 voice remains at the microphone(s) 83 and the microphone(s) 83 may transmit (also referred to herein as TX) the local party's 15 voice (e.g., Voice (Local) to the remote party at the receiving (RX) side of the system 8. In this regard, the audio echo cancellation module 78 may enable cancellation of an echo associated with known voice data of a remote party and known Youtube™ (Local) audio data.

Referring now to FIG. 7, a system for removing echo according to an example embodiment is provided. In the example embodiment of FIG. 7, presume that two users are participating in a call (e.g., telephone call, video conference call, etc.) and that each of the users may utilize one of the communications devices 165, 167 to connect the call. By utilizing the communications devices 165, 167 both communication devices 165, 167 participating in the call may include audio echo cancellation functionality provided by the audio echo cancellation module 78. In addition, in the example embodiment of FIG. 7, consider that a first user (e.g., user 1) of a communication device (e.g., communication device 165) relates to a remote party at a reception (RX) side of the system 9 and a second user 15 (e.g., local party 15) (e.g., user 2) of a communication device (e.g., communication device 167) is located in front of or nearby a microphone(s) 83. Consider further that both of the communications devices of users 1 and 2 may be receiving audio and/or video such as, for example, Youtube™ data from the network entity 110. The audio/video data may be streamed or broadcast from the network entity 110 (e.g., synchronously) to the communications devices 165, 167 in this example embodiment (for example, via execution by processor 70 of a synchronization API). The YouTube™ data may relate to the same YouTube™ video being streamed or broadcast to the communication devices 165, 167, in this example embodiment.

At the receiving (RX) side of the system 9, the audio echo cancellation module 78 may detect a voice (e.g., Voice (Remote)) of the remote party (e.g., user 1), on a communication channel 2, participating in the call. Additionally, the audio echo cancellation module 78 may detect, via communication channel 2, audio of a YouTube™ video (e.g., Youtube™ (Remote) audio data (also referred to herein as Youtube™ (Remote)) being played on behalf of the remote party. As such, in the example of FIG. 7, voice data (e.g., Voice (Remote)) of the remote party and Youtube™ audio data (e.g., Youtube™ Remote) being played remotely on behalf of the remote party are detected via the communication channel 2, by the audio cancellation module 78. Additionally, the audio echo cancellation module 78 may detect Youtube™ (Local) audio data played on behalf of the local party 15 based on a detection of the Youtube™ (Local) audio data on communication channel 4. The audio echo cancellation module 78 may instruct or enable the echo cancel device 71 (e.g., echo canceller(s) 72) to subtract the Youtube™ (Remote) audio data from the Youtube™ (Local) audio data. As such, the echo cancel device 71 may remove the echo associated with the Youtube™ (Remote) audio data and may output voice data (e.g., Voice (Remote) data) of the remote party who may be speaking during the call to the audio mixer 75.

The audio mixer 75 may also receive the Youtube™ (Local) audio data via communication channel 4. In this regard, the audio mixer 75 may combine the Voice (Remote) data with the Youtube™ (Local) data. In response to combining the Voice (Remote) data with the Youtube™ (Local) data, the audio mixer 75 may output combined data to the speaker(s) 87 which may play the combined audio data and may enable an input of the microphones(s) 83 to capture the combined audio data. In addition, the microphone(s) 83 may capture voice data of the local party 15 (e.g., Voice (Local)) who may be speaking during the call. As such, voice data (e.g., Voice (Remote)) of the remote party, voice data (e.g., Voice (Local)) of the local party and Youtube™ audio data (e.g., Youtube™ Local) being played on behalf of the local party 15, for example, by a communication device 167, may be detected at the input of the microphone(s) 83.

As such, the audio echo cancellation module 78 may determine that there is echo associated with the remote party's voice (e.g., Voice (Remote)) and may instruct or enable the echo cancel device 73 (e.g., echo canceller(s) 72) to remove the echo associated with the remote party's voice. In this regard, the echo cancel device 73 may subtract the known voice data of the remote party based on the previous detection of the remote party's voice (e.g., Voice (Remote)) output from echo cancel device 71, for example, from the voice data of the remote party detected in the audio data at the microphone(s) 83. As such, the echo cancel device 73 and/or the microphone(s) 83 may enable output or transmission (TX) of the Youtube™ (Local) audio data and the voice (e.g., Voice (Local)) of the local party to the remote party at the receiving (RX) side.

Referring now to FIG. 8, a system for removing echo according to an example embodiment is provided. In the example embodiment of FIG. 8, presume that two users are participating in a call (e.g., telephone call, video conference call, etc.) and that one of the users may utilize one of the communications devices 165, 167 to connect the call and the other user may utilize a terminal device 169, 171 (e.g., electronic device 90) to connect the call. As such, one of the users may be utilizing a device (e.g., the user utilizing a communication device 165) with audio echo cancellation functionality provided by the audio echo cancellation module 78. In this regard, in the example embodiment of FIG. 8, the audio echo cancellation module 78 of the communication device (e.g., communication device 165) may account for and remove echo on behalf of both users participating in the call.

In the example embodiment of FIG. 8, consider that the first user (e.g., user 1) corresponds to a remote party/user at a reception (RX) side of the system 10 which may be utilizing a terminal device 171 (e.g., electronic device 90). The terminal device 171 may not include an audio echo cancellation module 78 to provide echo cancellation. Also, in the example embodiment of FIG. 8, presume that a second user 15 (e.g., local party 15) (e.g., user 2) may be located in front of or nearby a microphone(s) 83 and may be utilizing a communication device such as, for example, communication device 165. Presume further that the terminal device 171 and the communication device 165 may be receiving audio and/or video from the network entity 110. For purposes of illustration, and not of limitation, the audio and/or video data being received from the network entity 110 may, but need not, be YouTube™ data, which may be streamed or broadcast from the network entity 110 synchronously to the communication device 165 and the terminal device 171. The YouTube™ data may relate to the same YouTube™ video being streamed or broadcast to the communication device 165 and the terminal device 171. In the example embodiment of FIG. 8, the communication device 165 and the terminal device 171 may receive the data (e.g., synchronously) from the network entity 110 by execution (for example, via a processor 70 and/or processor 94) of a synchronization API.

At the reception (RX) side, in the example embodiment of FIG. 8, voice data of a remote party (e.g., Voice (Remote)) who may be speaking on the call, and Youtube™ data (e.g., Youtube™ (Remote) audio data) being played on behalf of the remote party, for example by the terminal device 171 of the remote party may be detected by the audio echo cancellation module 78 on communication channel 1. Additionally, the Youtube™ data detected as being played, via communication device 165, on behalf of the local party 15 may be detected, by the audio echo cancellation module 78, on communication channel 6. The audio echo cancellation module 78 may enable or instruct the echo cancel device 80 (e.g., echo canceller(s) 72) to subtract the Youtube™ (Remote) audio data from the Youtube™ (Local) audio data that was detected on communication channel 6 to obtain audio data corresponding to voice data (e.g., Voice (Remote)) of the remote party. The echo cancel device 80 may output the voice data (e.g., Voice (Remote)) of the remote party to the audio mixer 75. The Youtube™ (Local) audio data detected on communication channel, by the audio echo detection module 78, may be received by the audio mixer 75. In this regard, the audio mixer 75 may combine the voice data (e.g., Voice (Remote)) of the remote party with the Youtube™ data (e.g., Youtube (Local)) of the local party 15 and the audio mixer 75 may output this combined audio data to the speaker(s) 97. The speaker(s) 97 may play or output this combined audio data and the microphone(s) 83 may capture the combined audio data at its input.

In addition, the microphone(s) 83 may capture a voice of the local party (e.g., Voice (Local)) who may be speaking on the call (e.g., telephone call, video conference call, etc.). As such, voice data of the remote party (e.g., Voice (Remote)), Youtube™ data played on behalf of the local party 15 (e.g., Youtube™ (Local)) and voice data of the local party (e.g., Voice (Local)) may be captured at the input of the microphone(s) 83. In this regard, the audio echo cancellation module 78 may detect echo at the input of the microphone(s) 83. For instance, since the local party 15, may likely hear the voice of the remote party via a speaker and the Youtube™ audio data being played locally, the Voice (Remote) data and the Youtube™ (Local) audio data at the input of the microphone(s) 83 may cause echo. As such, the audio echo cancellation module 78 may instruct or enable the echo cancel device 82 (e.g., echo canceller(s) 72) to utilize the previously detected known voice data (e.g., Voice (Remote)) of the remote party to subtract out the voice data (e.g., Voice (Remote)) of the remote party from the input of the microphone(s) 83. In response to subtracting out the voice data of the remote party, the audio echo cancellation module 78 may instruct or enable the echo cancel device 84 (e.g., echo canceller(s) 72) to utilize the previously detected known Youtube™ audio data, detected on communication channel 6, played on behalf of the local party 15 to subtract out the Youtube™ data (e.g., Youtube™ (Local)) of the local party detected at the input of the microphone(s) 83. As such, the echo cancel device 84 may output the voice data (e.g., Voice (Local)) of the local party 15, which may enable the microphone(s) 83 to transmit the voice data (e.g., Voice (Local)) of the local party 15 to the remote party at the reception (RX) side of the system 10.

By enabling the echo cancel device 82 to subtract out the voice data (e.g., Voice (Remote)) of the remote party and the echo cancel device 84 to subtract out the Youtube™ audio data (e.g., Youtube™ (Local)) being played on behalf of the local party 15, the audio echo cancellation module 78 may enable the microphone(s) 83 to output or transmit the voice data (e.g., Voice (Local)) of the local party 15 to the remote party at the reception side (RX). In this regard, the remote party may receive audio data that does not include (or is free from inclusion of) one or more echoes. This may be beneficial since the terminal device 171 may not include an audio echo cancellation module 78, in this example embodiment of FIG. 8.

In some example embodiments of FIGS. 6, 7 and 8, the Youtube™ (Remote) audio data may be slightly delayed with respect to the Youtube™ (Local) audio data in order for the audio echo cancellation module 78 to perform echo cancellation. In other example embodiments, the Youtube™ (Remote) audio data may be received ahead of the Youtube™ (Local) audio data (for example, in an instance which a network connection (e.g., Internet connection) of a device (e.g., communication device 167) of the local party is slower than the network connection of a device of the remote party).

In some other alternative example embodiments, in instances in which a remote user's audio track (e.g., Youtube™ (Remote)) is received/played before a local user's (e.g., local party 15) audio track (e.g., Youtube™ (Local)), the audio echo cancellation module 78 may search for the local audio track forward in a buffer and may remove the local audio track from an incoming voice stream with a negative offset, as described more fully below.

For purposes of illustration and not of limitation, in an instance in which Youtube™ (Local) may be received or played later than Youtube™ (Remote) is received or played, some example embodiments may utilize a buffer (e.g., an audio buffer stored in a memory device (e.g., memory device 76 of FIG. 2) for storage of audio data. In this regard, the audio echo cancellation module 78 may search forward in the buffer and may identify incoming audio data by examining audio data in the buffer, but which may not have been played yet. In this regard, the audio echo cancellation module 78 may search forward in the buffer for a local audio track (e.g., Youtube™ (Local) audio data) received/played after receipt/play of a remote audio track (e.g., Youtube™ (Remote)) and may remove the local audio track (e.g., Youtube™ (Local) audio data) from an incoming audio stream, since in this example embodiment the remote audio track (e.g., Youtube™ (Remote)) may be received or played prior to the local audio track (e.g., Youtube™ (Local)).

In instances in which the Youtube™ (Remote) audio data may be received, by a communication device, ahead of the Youtube™ (Local) audio data, the audio echo cancellation module 78 may mute the Youtube™ (Local) audio data and play the Youtube™ (Remote) audio data. As such, the audio echo cancellation module 78 may provide a speaker (e.g., speaker(s) 87) with voice data of a remote party (e.g., Voice (Remote)) and/or Youtube™ (Remote) audio data, instead of Voice (Remote) and/or Youtube™ (Local) audio data. In this regard, in some example embodiments, instances in which the remote (e.g., receiving (RX)) side of a system may be ahead of a local side of a system (e.g., system 8), the audio echo cancellation module 78 may ignore or mute the Youtube™ (Local) audio data. This approach may be utilized by the audio echo cancellation module 78 because the audio echo cancellation module 78 may be unable to remove or cancel out the Youtube™ (Remote) audio data since the audio echo cancellation module 78 may not have yet received the Youtube™ (Remote) audio data. In other words, the audio cancellation module 78 may need to know the Youtube™ (Remote) audio to subtract from the voice data (e.g., Voice (Remote)) and Youtube™ audio data (e.g., Youtube™ (Local) audio data).

Referring now to FIG. 9 a flowchart for removing one or more echoes from audio data according to an example embodiment is provided. At operation 900, an apparatus (e.g., audio echo cancellation module 78) may detect receipt of combined audio content including items of voice data (e.g., voice data of one or more users speaking) associated with speech content of one or more users (e.g., a local party, a remote party, etc.) participating in a call (e.g., a telephone call, video conference call, etc.). The combined audio content may also include information including audio data (e.g., YouTube™ data, Hulu™ data, MP3 data, etc.) being provided to the users during the call. The information including the audio data may be provided via a stream or broadcast (for example, from network entity 110).

At operation 905, an apparatus (e.g., audio echo cancellation module 78) may remove a first echo associated with a first item (e.g., Voice (Remote) data, etc.) of voice data associated with one of the users, from the combined audio content. The removal of the first echo may be based in part on a prior detection of the first item (e.g., Voice (Remote)) of the voice data. At operation 910, an apparatus (e.g., audio echo cancellation module 78) may remove a second echo (e.g., an echo associated with YouTube™ data, Hulu™ data, MP3 data, etc.) associated with the audio data, from the combined audio content, based in part on a previous detection of the audio data (e.g., Youtube™ (Local)) or a previous detection of data (e.g., Youtube™ (Remote)) that corresponds to the audio data (e.g., Youtube™ (Local)).

It should be pointed out that FIG. 9 is a flowchart of a system, method and computer program product according to some example embodiments of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in some example embodiments, the computer program instructions which embody the procedures described above are stored by a memory device (for example, memory device 76, memory 96, memory 106) and executed by a processor (for example, processor 70, processor 94, processor 104, audio echo cancellation module 78). As will be appreciated, any such computer program instructions may be loaded onto a computer or other programmable apparatus (for example, hardware) to produce a machine, such that the instructions which execute on the computer or other programmable apparatus cause the functions specified in the flowchart blocks to be implemented. In some example embodiments, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some example embodiments, an apparatus for performing the method of FIG. 9 above may comprise a processor (for example, the processor 70, the processor 94, processor 104, the audio echo cancellation module 78) configured to perform some or each of the operations (900-910) described above. The processor may, for example, be configured to perform the operations (900-910) by performing hardware implemented logical functions, executing stored instructions, or executing algorithms for performing each of the operations. Alternatively, the apparatus may comprise means for performing each of the operations described above. In this regard, according to some example embodiments, examples of means for performing operations (900-910) may comprise, for example, the processor 70 (for example, as means for performing any of the operations described above), the processor 94, the processor 104, the audio echo cancellation module 78 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/ or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving combined audio content comprising items of voice data associated with speech content of one or more users participating in a call and information comprising audio data being provided to the users during the call;
removing a first echo associated with a first item of the voice data associated with one of the users, from the combined audio content, based in part on a prior detection of the first item of the voice data corresponding to one of the users; and
removing, via a processor, a second echo associated with the audio data, from the combined audio content, based in part on a previous detection of the audio data or a previous detection of data that corresponds to the audio data,
wherein the previous detection of the audio data relates to playing of the audio data of the information, on behalf of a remote user of the users, before subsequent playing of the audio data, on behalf of a local user of the users.

2. The method of claim 1, wherein removing the second echo comprises subtracting the previous detection of the audio data or the previous detection of the data from the audio data.

3. The method of claim 1, wherein the information comprises video data that corresponds to the audio data.

4. The method of claim 1, wherein being provided comprises receiving the information via at least one of a stream or broadcast from a network device; and
detecting that the information is also being received synchronously by a device of one of the users during the call.

5. The method of claim 4, further comprising:
executing a synchronization application programming interface to enable the detecting of the information being received synchronously.

6. The method of claim 1, further comprising:
obtaining audio content with reduced echo based in part on the removed first echo and the removed second echo.

7. The method of claim 6, further comprising:
enabling provision of the obtained audio content with reduced echo to at least one device of one of the users participating in the call.

8. The method of claim 7, wherein enabling provision further comprises enabling sending of the obtained audio to the device to enable the device to utilize the obtained audio content, wherein the device is incapable of removing echo associated with the audio data.

9. The method of claim 1, further comprising:
muting the audio data at the microphone; and
continuing to play the audio data that was previously detected.

10. An apparatus comprising:
at least one processor; and
at least one memory including computer program code, the at least one memory and the computer program code configured to, with the at least one processor, cause the apparatus to perform at least the following:

receive combined audio content comprising items of voice data associated with speech content of one or more users participating in a call and information comprising audio data being provided to the users during the call;

remove a first echo associated with a first item of the voice data associated with one of the users, from the combined audio content, based in part on a prior detection of the first item of the voice data corresponding to one of the users; and remove a second echo associated with the audio data, from the combined audio content, based in part on a previous detection of the audio data or a previous detection of data that corresponds to the audio data, wherein the previous detection of the audio data relates to playing of the audio data of the information, on behalf of a remote user of the users, before subsequent playing of the audio data, on behalf of a local user of the users.

11. The apparatus of claim 10, wherein the memory and computer program code are configured to, with the processor, cause the apparatus to:

remove the second echo by subtracting the previous detection of the audio data or the previous detection of the data from the audio data.

12. The apparatus of claim 10, wherein the information comprises video data that corresponds to the audio data.

13. The apparatus of claim 10, wherein being provided comprises receiving the information via at least one of a stream or broadcast from a network device, wherein the memory and computer program code are configured to, with the processor, cause the apparatus to:

detect that the information is also being received synchronously by a device of one of the users during the call.

14. The apparatus of claim 13, wherein the memory and computer program code are configured to, with the processor, cause the apparatus to:

execute a synchronization application programming interface to enable the detecting of the information being received synchronously.

15. The apparatus of claim 10, wherein the memory and computer program code are configured to, with the processor, cause the apparatus to:

obtain audio content with reduced echo based in part on the removed first echo and the removed second echo.

16. The apparatus of claim 15, wherein the memory and computer program code are configured to, with the processor, cause the apparatus to:

enable provision of the obtained audio content with reduced echo to at least one device of one of the users participating in the call.

17. The apparatus of claim 16, wherein the memory and computer program code are configured to, with the processor, cause the apparatus to:

enable provision by enabling sending of the obtained audio to the device to enable the device to utilize the obtained audio content, wherein the device is incapable of removing echo associated with the audio data.

18. The apparatus of claim 10, wherein the memory and computer program code are configured to, with the processor, cause the apparatus to:

mute the audio data at the microphone; and continue to play the audio data that was previously detected.

19. A computer program product comprising at least one non-transitory computer-readable storage medium having computer-readable program code portions stored therein, the computer-readable program code portions comprising:

program code instructions configured to facilitate receipt of combined audio content comprising items of voice data associated with speech content of one or more users participating in a call and information comprising audio data being provided to the users during the call;

program code instructions configured to remove a first echo associated with a first item of the voice data associated with one of the users, from the combined audio content, based in part on a prior detection of the first item of the voice data corresponding to one of the users; and program code instructions configured to remove a second echo associated with the audio data, from the combined audio content, based in part on a previous detection of the audio data or a previous detection of data that corresponds to the audio data, wherein the previous detection of the audio data relates to playing of the audio data of the information, on behalf of a remote user of the users, before subsequent playing of the audio data, on behalf of a local user of the users.

20. The computer program product of claim 19, further comprising:

program code instructions configured to remove the second echo by subtracting the previous detection of the audio data or the previous detection of the data from the audio data.

* * * * *